United States Patent [19]

Schulte

[11] Patent Number: 5,508,763
[45] Date of Patent: Apr. 16, 1996

[54] PROJECTOR

[75] Inventor: Wolfgang Schulte, Frankfurt am Main, Germany

[73] Assignee: SW Stanzwerk Glarus AG, Glarus, Switzerland

[21] Appl. No.: 244,789

[22] PCT Filed: Dec. 10, 1992

[86] PCT No.: PCT/EP92/02846

§ 371 Date: Aug. 25, 1994

§ 102(e) Date: Aug. 25, 1994

[87] PCT Pub. No.: WO93/12455

PCT Pub. Date: Jun. 24, 1993

[30] Foreign Application Priority Data

Dec. 12, 1991 [DE] Germany .............. 41 40 911.6

[51] Int. Cl.⁶ ............................................ G03B 21/28
[52] U.S. Cl. ....................... 353/10; 353/38; 353/67; 359/479
[58] Field of Search ..................... 353/63, 64, 65, 353/66, 67, 38, 7, 10, DIG. 4, 74, 77, 78; 359/478, 479, 471

[56] References Cited

U.S. PATENT DOCUMENTS

| | | |
|---|---|---|
| 2,391,430 | 12/1945 | Macek . |
| 3,014,403 | 12/1961 | Alops . |
| 3,052,753 | 9/1962 | Schwarz et al. . |
| 3,324,760 | 6/1967 | Collender ........................ 353/10 |
| 4,078,854 | 3/1978 | Yano ................................ 353/10 |
| 4,386,833 | 6/1983 | Hirose ............................. 353/67 |
| 5,293,188 | 3/1994 | Yoshida et al. ................. 353/67 |

*Primary Examiner*—William C. Dowling
*Attorney, Agent, or Firm*—Larson and Taylor

[57] ABSTRACT

The projector has an essentially afocal projection system, in particular for the reproduction of three-dimensional images. This system has a system of convex lenses (1) on the side of the object and a Fresnel lens (2) on the side of the image. The lenses are larger than the transverse dimension of the object to be reproduced. By providing a double reflection (3, 4), this projection system is able to generate, in addition to the reproduction of two-dimensional images, a three-dimensional image of a real, three-dimensional object, "positioned in space" and whose sides are correctly aligned for the benefit of an observer. Preferably, a plane mirror (3) is used for this purpose as well as a beam splitter (4) that is inclined by about 45° with respect to the main axis (5) of the system of convex lenses (1).

10 Claims, 9 Drawing Sheets

PROJECTOR

This invention relates to a projector for demonstration and advertising purposes with a system of convex lenses on the side of the object and a system of convex lenses on the side of the image.

Such projectors are normally used for the projection of two-dimensional illustrations on film, foil, and paper, upon a screen or a ground-glass disk. The reproductions are also two-dimensional and make a rather flat and poor impression unless one works with certain tricks of the trade, such as, for example, multi-colored images that are projected on top of each other, and corresponding glasses. The same applies to illustrations using video equipment on screens.

In addition, holograms are occasionally used for advertising purposes; these holograms reproduce a three-dimensional image of an object. Holograms, however, require a complicated recording technique that only shows the three-dimensional image of the object used during the recording in a single position.

In contrast, the invention is based on the task of creating a projector of the kind mentioned initially which, in addition to its ability to reproduce two-dimensional images, will in particular also be able to provide the plastic reproduction of physical objects and which, using very simple means, will generate a three-dimensional image for the observer that shows a three-dimensional object that is "positioned in space."

The problem is solved by the invention in that the baseboard is made to hold a three-dimensional object, with the system of convex lenses on the side of the image including a Fresnel lens, while the length of the beam path, measured along the optical axis between the system of convex lenses on the side of the object and the Fresnel lens, is essentially equal to the sum of their focal distances, the diameter of the lenses being greater than the extent of the object to be reproduced, as measured transversely with respect to the main axis of the system of convex lenses on the side of the object, and whose interval from the system of convex lenses on the side of the object is so small that the object is reproduced at least partly behind the Fresnel lens as a three-dimensional aerial view.

Using the equipment proposed here, it is possible to generate a three-dimensional image for an observer who essentially looks along the optical axis toward the Fresnel lens from behind; this three-dimensional image reproduces an object arranged in front of the system of convex lenses on the side of the object. By properly selecting the focal distances of this system of convex lenses and of the Fresnel lens, an enlarged or reduced image of the object can be generated, as desired; by means of the interval between the object and the system of convex lenses, one can determine whether the image is completely behind the Fresnel lens as far as the observer is concerned or whether, because of the three-dimensional depth of the object, it appears partly in front and partly behind the Fresnel lens.

By convex lens system one means here not only individual lenses, but also systems consisting of several lenses, even if they contain one or several dispersion lenses, so long the lens system on the whole has focusing properties and thus a positive focal distance on the side of the image.

The system of convex lenses on the side of the object and the Fresnel lens in this case form an afocal or almost afocal system because their mutually facing focal points coincide, or are only up to about 10% of the sum of their focal distances away from each other. In that way one can make certain that the object to be reproduced will be shown three-dimensionally over all of the depth planes of the object area, that is to say, independently of the width of the object, with essentially the same reproduction scale.

An impressive three-dimensional effect of the image thus generated can also be traced back to the fact that, in the proposed projector, the lenses are greater than the transversal dimension of the object to be reproduced. In this way, the optical system "sees" not only the surfaces of the object to be reproduced that face toward it, but also its side surfaces and, possibly, even backward-inclining surfaces, and it also reproduces them.

Until now, afocal optical systems have only been used for other purposes, for example, for adjusting a telescope for great range.

In a preferred version of the invention, the Fresnel lens has a greater focal distance than the system of convex lenses on the side of the object, so that the generated aerial view represents an enlargement of the depicted real object. Such a projector is particularly suitable for the enlarged three-dimensional reproduction of objects, such as, for example, jewelry, watches, and other comparatively small objects. In this case, it is not only the optical appearance of the aerial view, positioned freely in space, but also the unaccustomed three-dimensional enlargement that contribute to the observer's amazement.

The components mentioned so far will suffice for a simple model of a projector according to the invention. The equipment, however, becomes comparatively long and reproduces the objects with their sides reversed and standing on their head. That of course does not matter in the case of many objects, above all when, in a preferred version of the invention, the baseboard can be moved in a rotating manner so that the objects placed on top or against it will be presented to the imaging optical system from many sides.

The practical utility of this new projector is improved when it is made as an upright unit with a baseboard arranged underneath, a system of convex lenses built in above it, a reflector device arranged on top of that, and a Fresnel lens built in transversely next to said reflector device. Here it is advantageous to shorten the length, to align the lower part of the equipment up to eye level in a space-saving vertical manner, and to orient the essentially horizontal direction of viewing at the Fresnel lens.

The reflector device can be a simple plane mirror that is built in with an inclination of, for instance, 35° to 55°, preferably about 45°, with respect to the perpendicular main axis of the system of convex lenses on the side of the object and which deflects the beams, coming from underneath, in a mainly horizontal direction toward the Fresnel lens. As a further development of this idea, the beams, deflected against this first mirror, can be deflected once again by 90° in their horizontal plane by means of a second mirror before they get to the Fresnel lens; in a preferred version, the second mirror and the Fresnel lens form a unit that can be rotated together around an axis positioned transversely with respect to the main axes of the system of convex lenses on the side of the object and of the Fresnel lens. In this way, one can adjust the main axis of the Fresnel lens with each individually desired inclination angle with respect to the horizontal.

In another preferred version of the invention, the reflector device consists of a beam splitter that is inclined toward the main axis of the system of convex lenses and that is partly permeably metal-coated, and at least one plane mirror, arranged transversely and/or parallel with respect to the main axis of the system of convex lenses. The inclination of the beam splitter with respect to the main axis of the system of convex lenses on the side of the object here can be, for example, 45°. The beam splitter, in the form of a unilaterally, partly permeable metal-coated glass plate, reflects a part of the light hitting it at an angle of 45°, while the other part is allowed to pass through. In the ideal case, the portions of passing and reflected light should be equal. Behind the beam splitter, one can then arrange a plane mirror whose plane is perpendicular to the axis of the system of convex lenses. Light passing through the beam splitter is reflected against the plane mirror back to the beam splitter and is again allowed to partially pass through and be partly reflected by the beam splitter. This last-mentioned light portion, which amounts to as much as one-fourth of the original light flow, then hits the Fresnel lens. As a result of the reflection against the plane mirror back to the beam splitter, the beam path is folded and the projector can thus be built in a compact fashion in spite of the relatively large focal distance of the system of convex lenses and the Fresnel lens.

In a preferred design variant, the system of convex lenses on the side of the object consists of two plane convex lenses. Such lenses can be made with relatively large diameters and good optical quality and are comparatively reasonably priced.

Fresnel lenses are also available in relatively large dimensions; the size of these lenses helps decide both the possible size of the objects to be illustrated and the image magnification, that is to say, the illustration of the entire, enlarged object.

In a practical manner, the plane convex lenses are essentially identical and are arranged with a main point interval with relation to each other that amounts to about one-fourth to one-fifth of their individual focal distance. This arrangement turns out to be particularly practical in actual use. Both plane convex lenses should be arranged along the same orientation, and with an interval between plane surfaces that corresponds to about one-seventh of their focal distance. The level sides of the plane convex lenses are here made to face toward the object in a practical manner. For practical purposes, it turns out to be particularly advantageous when the convex lenses have a curvature radius of about 185 mm and an apex thickness of 19 mm and when they consist of a material with a refraction index of more that 1.5. The diameter of such lenses can then readily consist of 140 to 150 mm and more.

At this point it must be noted that one can use a large number of other lenses and lens groups for the system of convex lenses on the side of the object, also possibly one or several Fresnel lenses, provided they meet the particular requirements in terms of size, focal distance, and optimum image reproduction quality. Theoretically, the system of convex lenses on the side of the image could also consist of at least one standard lens. Because of the size, the weight, the costs, and the external impression, one should, however, give preference at this point to a Fresnel lens.

In a preferred version of the invention, the Fresnel lens has an optical interval (that is to say, including the possibly folded beam path) from the main plane of the system of convex lenses on the side of the object in the range between 95% and 105% of the sum of the focal distances of the system of convex lenses and of the Fresnel lens. It turns out to be practical to place this optical interval specifically in the range between 710 and 760 mm.

In yet another preferred version, the projector has a two-part housing whose first part includes a baseboard and the system of convex lenses arranged at an interval therefrom, while the second part includes the partly metal-coated beam splitter, a plane mirror and a Fresnel lens, with the plane mirror, the beam splitter and the Fresnel lens, in a side view, forming an isosceles rectangular triangle whose hypotenuse is the beam splitter and where the housing parts are arranged in relation to each other so that the beam splitter faces toward the system of convex lenses and that the beam splitter plane is cut at an angle of about 45° by the axis of the system of convex lenses. These two housing parts can easily be assembled to form a complete projector. In a practical fashion, the two housing parts are arranged on top of each other; the baseboard is located in the lower area of the first housing part; the system of convex lenses is arranged over it and the second part of the housing is placed on top of the first housing part. The beam path thus initially runs from the object vertically upward and, after double reflection against the mirror and the beam splitter, it runs in a horizontal plane.

The baseboard is preferably a motor-powered turntable. Naturally the image is then also rotated along with the object for the viewing of the observer and, quite understandably, it thus arouses greater attention than a simply static image.

In addition, a cold-light source is provided in the area of the first housing part. To be able to produce a correspondingly bright image of the object one must of course also illuminate the object itself. In spite of the reflection and passage losses along the beam splitter, one can generate an extremely bright image of the object that is clearly visible even in normal daylight. This is due, among other things, to the fact that, in contrast to projection against ground glass disks, no light whatsoever is diffusely scattered into the room. The baseboard or the turntable is preferably a glass plate under which one can arrange fluorescent lamps whose light will penetrate through the glass plate and contribute to the illumination of the object. In a practical manner, one can also arrange mirrors in the space surrounding the turntable in such a manner that they will reflect the light of the existing illumination sources upon the object.

One version of the projector is particularly practical: here, an attached housing is provided for the purpose of accommodating the heat-generating components on the first housing part, preferably in the latter's lower area. For example, one could position here a motor for the turntable or a heat-generating light source whose light is conducted via glass fibers to the object without the object being heated up in any noticeable fashion.

In the preferred practical use, such a projector is used for the enlarged illustration of relatively small objects, such as, for example, watches, jewelry, and the like. The object is placed on the turntable and is then arranged decoratively in a corresponding retaining device on the turntable; here, the observer stands in the beam path behind the Fresnel lens and looks in the direction of the Fresnel lens, seeing an enlarged three-dimensional image "positioned" in front of and possibly behind the Fresnel lens, in a three-dimensional fashion in space (away from himself). He sees the image of the object in the same position and in the same state of motion, the way another observer sees the object itself from the rear of the housing upon looking at the turntable.

Additional advantages, features, and practical uses of the invention at hand will become clear on the basis of the following description of some preferred versions and the pertinent figures. To wit:

Figure 6A:
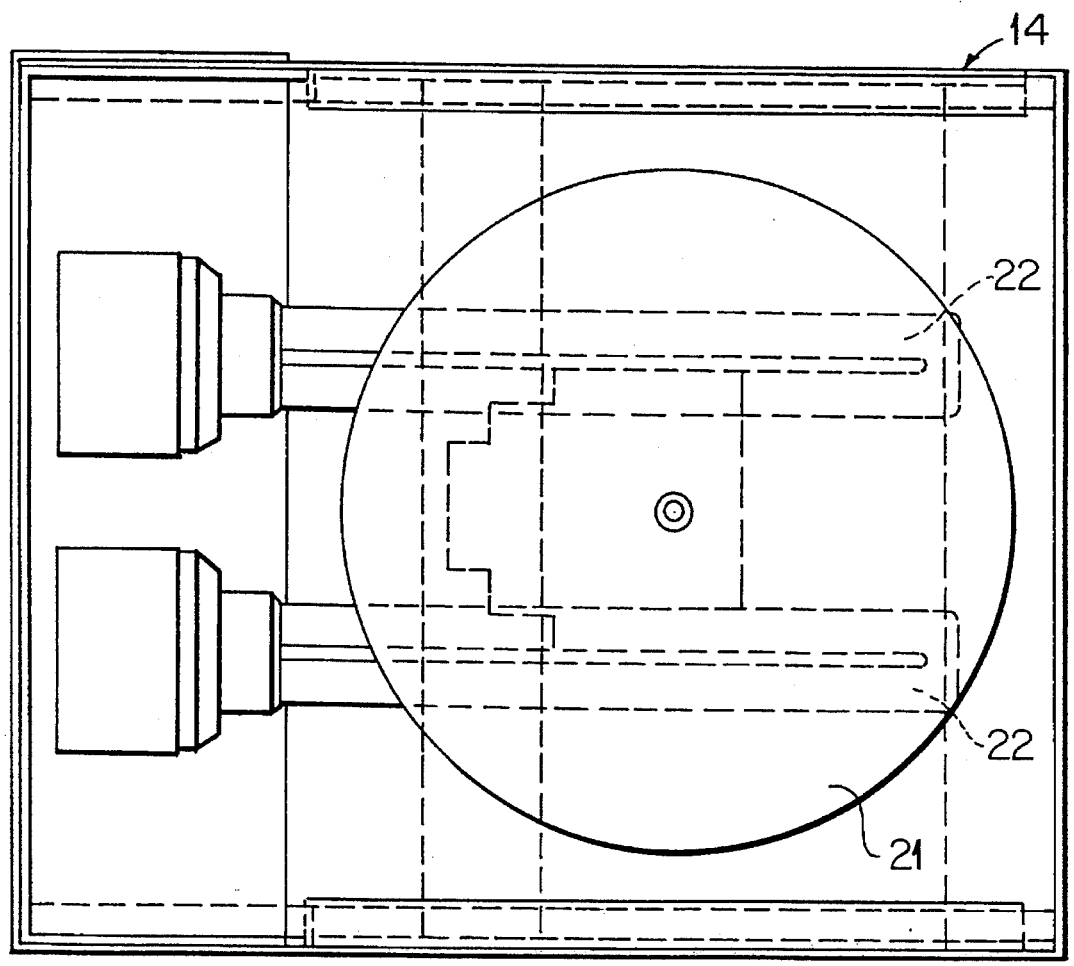
Figure 7B:
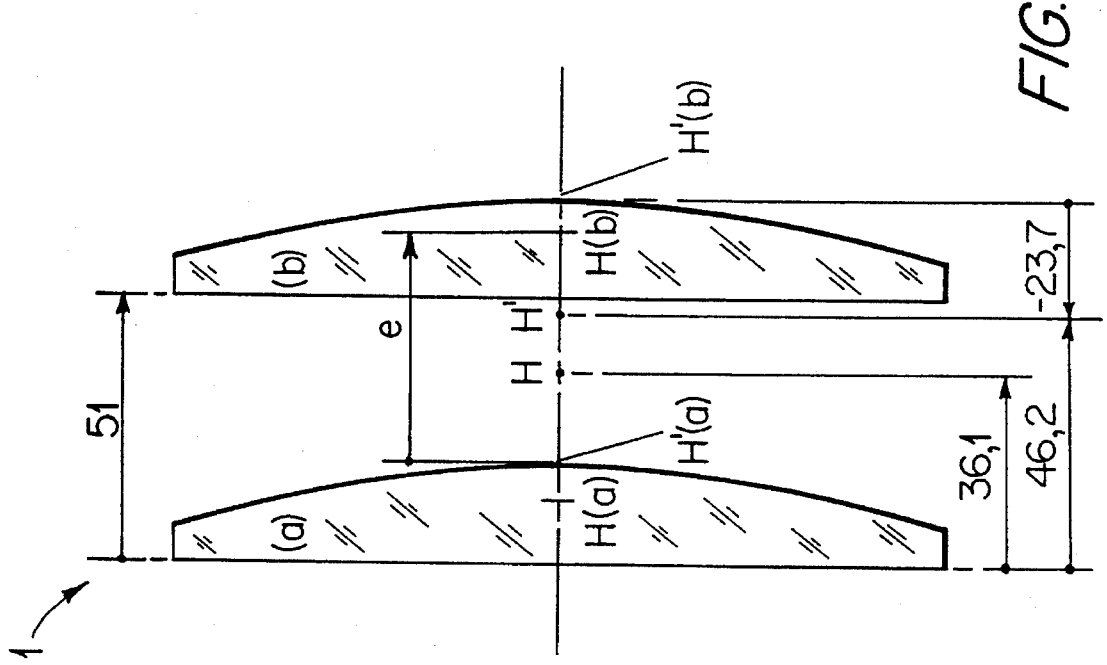
Figure 7A:
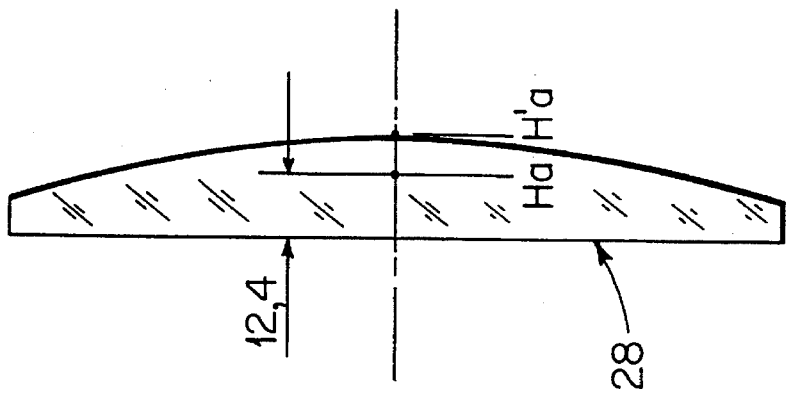
Figure 8:
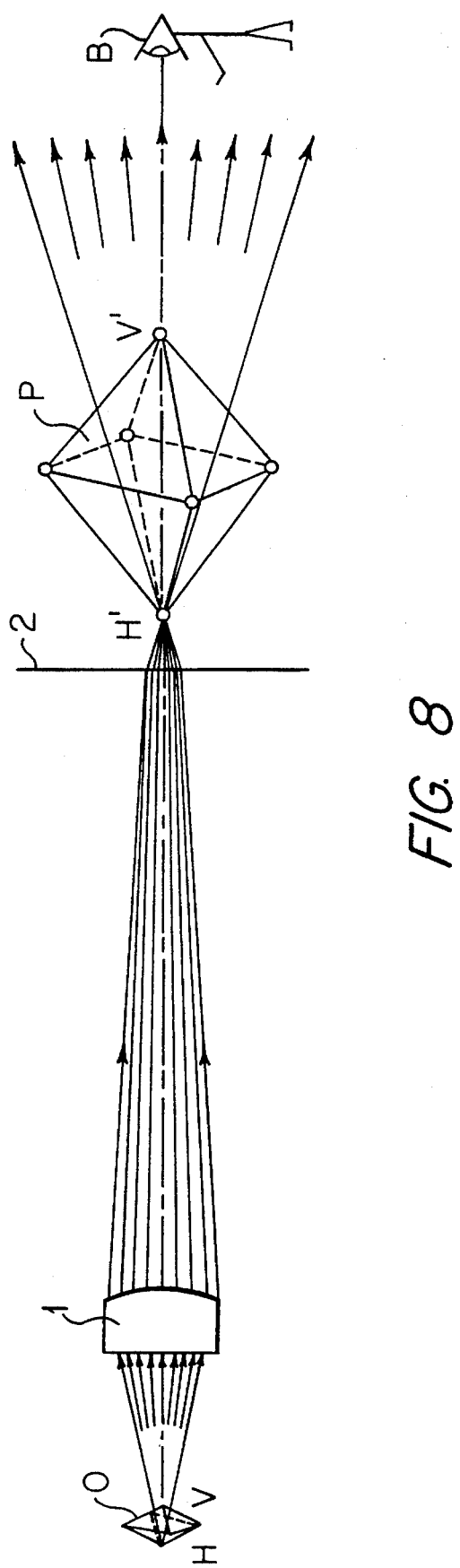
Figure 9A:
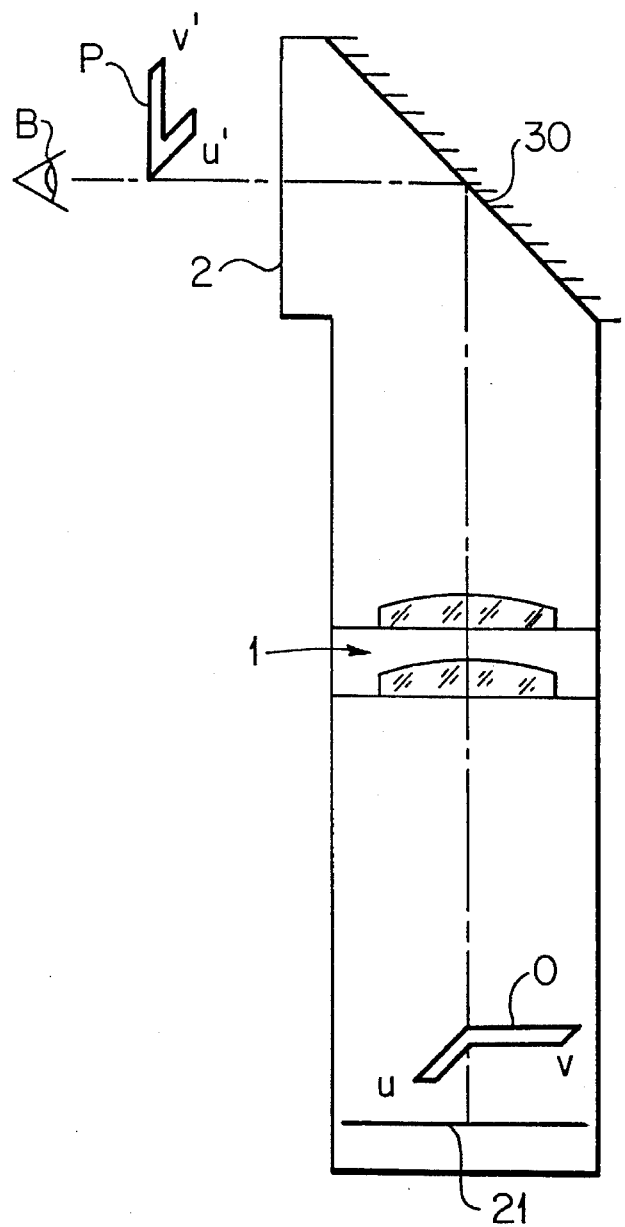
Figure 9B:
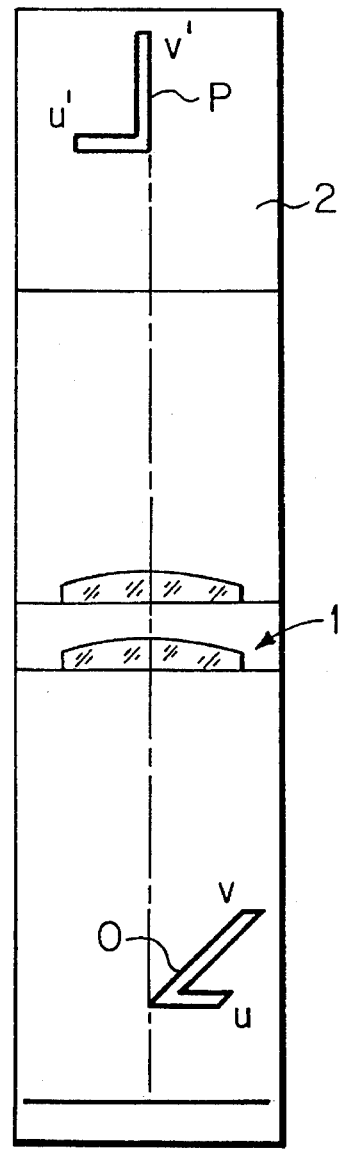
Figure 10A:
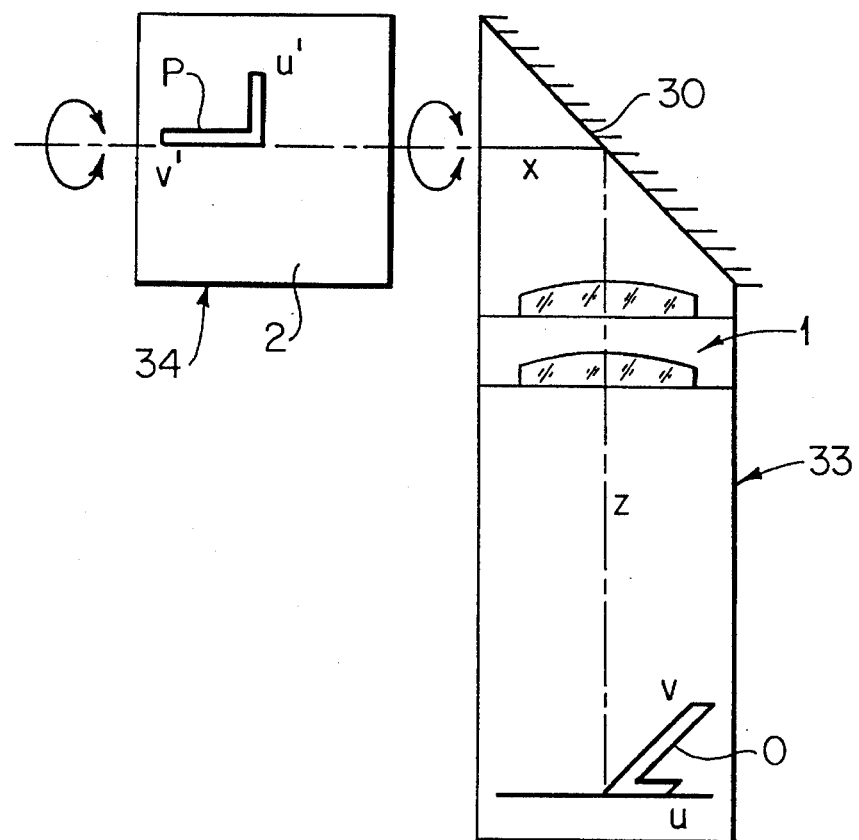
Figure 10B:
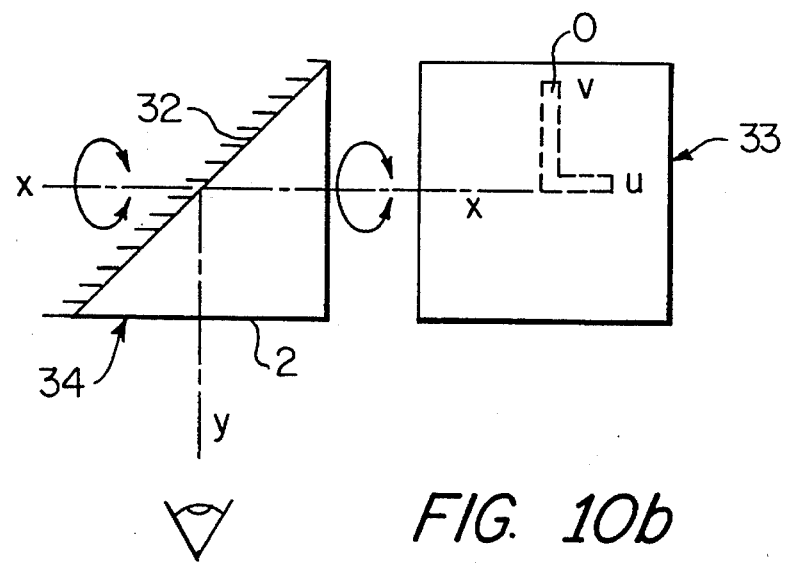

FIG. 6a, b is a drawer element of the lower housing pan in a top view and a longitudinal profile;

FIG. 7a is an individual convex lens;

FIG. 7b is a system of convex lenses;

FIG. 8 is a diagram illustrating the enlarged reproduction of an object by an afocal system that consists only of a system of convex lenses on the side of the object and a Fresnel lens;

FIG. 9a, b is a side view and a view from the direction of image observation of a projector with a one-time beam deflection by a plane mirror;

FIG. 10a, b is a diagram showing a view from the image observation and a top view upon a projector with a fixed plane mirror and a plane mirror that can be rotated together with the Fresnel lens.

Figure 1:
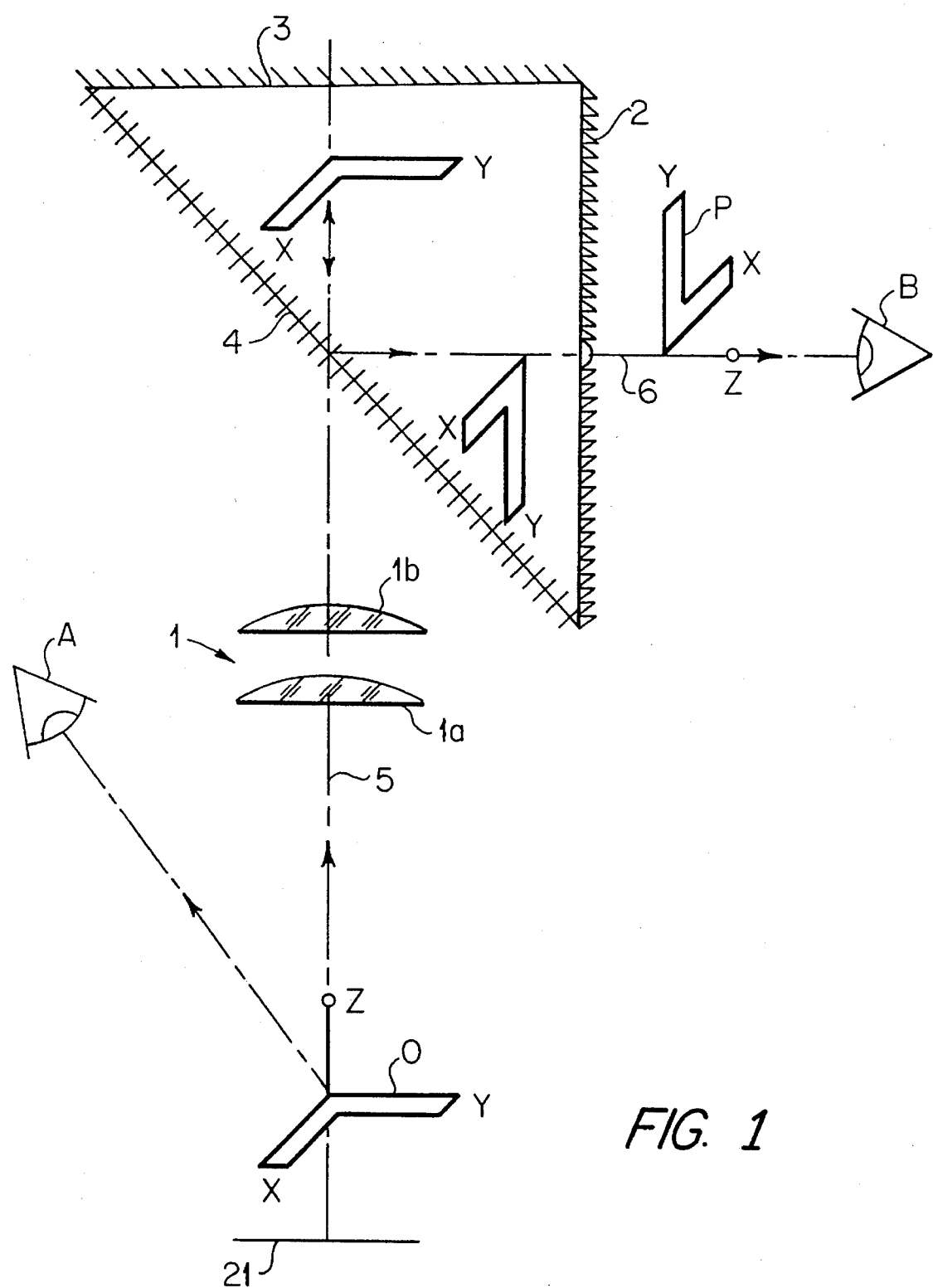
FIG. 1 is a diagram illustrating the upright reproduction of an object, with correct side arrangement, in a first model of the projector according to the invention.

In FIG. 1 below, one recognizes an object O that is labeled "L", for example, and that can, for instance, be on a turntable. An observer A, to the left and above object O in FIG. 1, whose eye is illustrated in diagrammatic form, views this object as an "L" with correctly positioned sides. The object is reproduced by two plane convex lenses 1a and 1b, and a Fresnel lens 2, with a part of the light that starts from the object and that is focused by plane convex lens 1a, 1b, being reflected against a beam splitter 4 to the left, while the other part passes through, upward, to a cover mirror 3, and that is essentially reflected completely back against the cover mirror. This reflected light is again partly reflected along the beam splitter in the direction of Fresnel lens (2), while the other part passes through the beam splitter and no longer plays any role in image generation.

An observer B, who looks at the Fresnel lens from the right, would, merely on the basis of the double reflection, see the object with its sides and height reversed because his direction of observation is exactly the opposite of the observer of the object. The optical system that consists of plane convex lenses and Fresnel lenses, however, brings about another image inversion, so that the observer, looking into the Fresnel lens, in the end sees image B of the object precisely in the same orientation and same position as observer A who looks directly at the object itself from behind. Here, image P can also be enlarged in keeping with the focal distance ratio between the Fresnel lens and the system of convex lenses.

Figure 2:
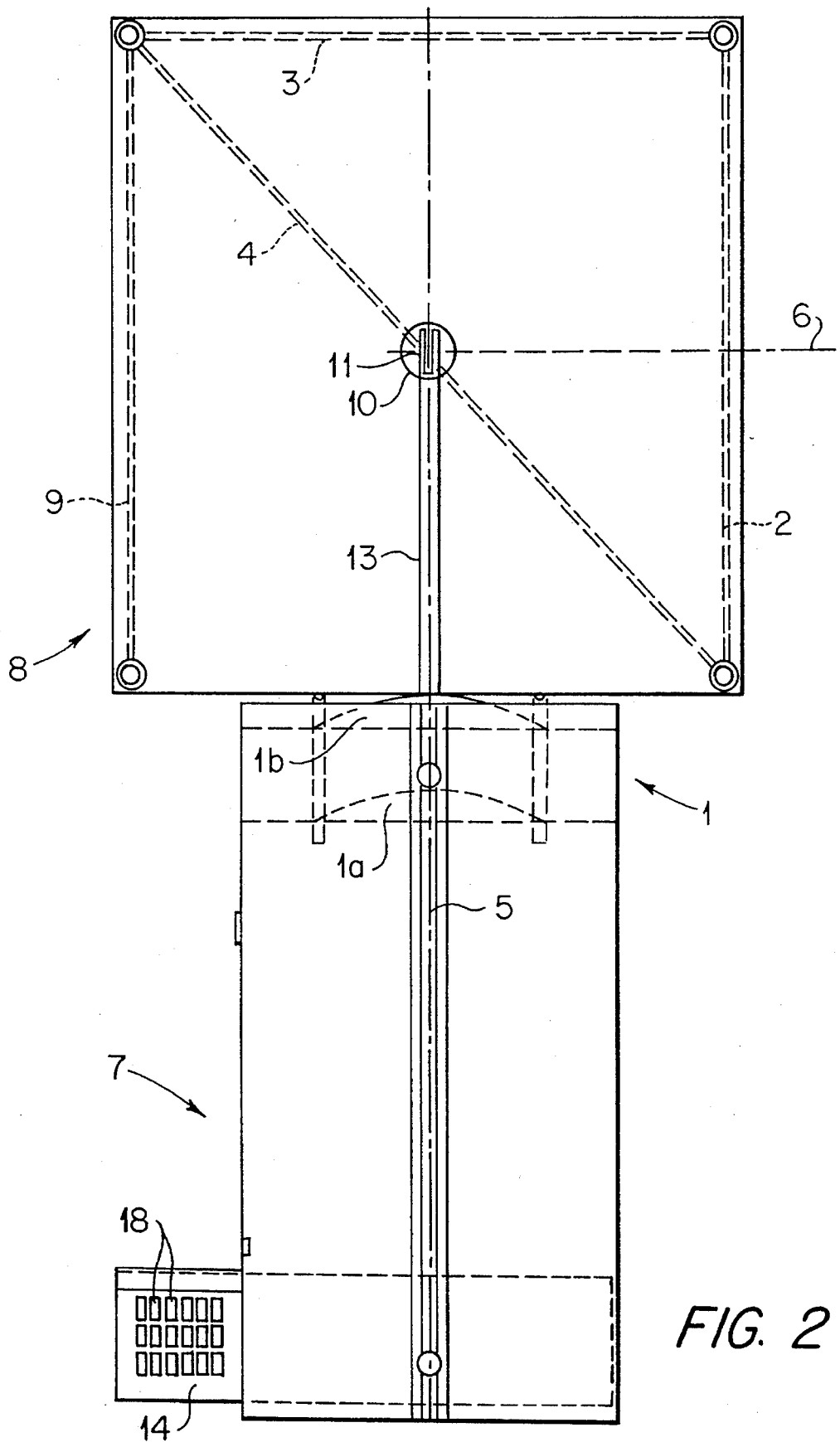
FIG. 2 is a side view of the projector according to FIG. 1, consisting of a lower housing part and an upper housing part.

In FIG. 2 one recognizes the projector in a side view; systems located inside the projector are drawn with broken lines. The projector consists of a lower housing part 7 and an upper housing part 8. A drawer unit 14 is located in the lower area of housing part 7. This drawer unit protrudes partly out of housing 7 and possibly heat-generating components can be positioned in the protruding part. Air slits 18 are provided in drawer part 14 for cooling purposes. Object O is on a turntable 21 that belongs to the drawer part 14, as will be described in greater detail in connection with FIG. 6.

In the upper area of housing part 7, there is a retaining device for the system of convex lenses 1 that consists of the two plane convex lenses 1a and 1b that are arranged behind each other with the same orientation. The plane convex lenses have a diameter of about 140 mm; the curvature radius of the convex surface is about 185 mm; the apex thickness, that is to say, the area of maximum thickness of the plane convex lens, is 18.9 mm. A glass with a refraction index of 1.5231 is used.

From these data one can also calculate the focal distances and the main point positions of the individual plane convex lenses 1a, 1b. The interval between the two plane surfaces is about 51 mm; the total focal distance of this lens system 1 on the side of the object is about 188.7 mm (see FIG. 7). The optical axis, running through the center of plane convex lenses 1a, 1b, is shown with a broken line and is labeled 5.

Figure 3:
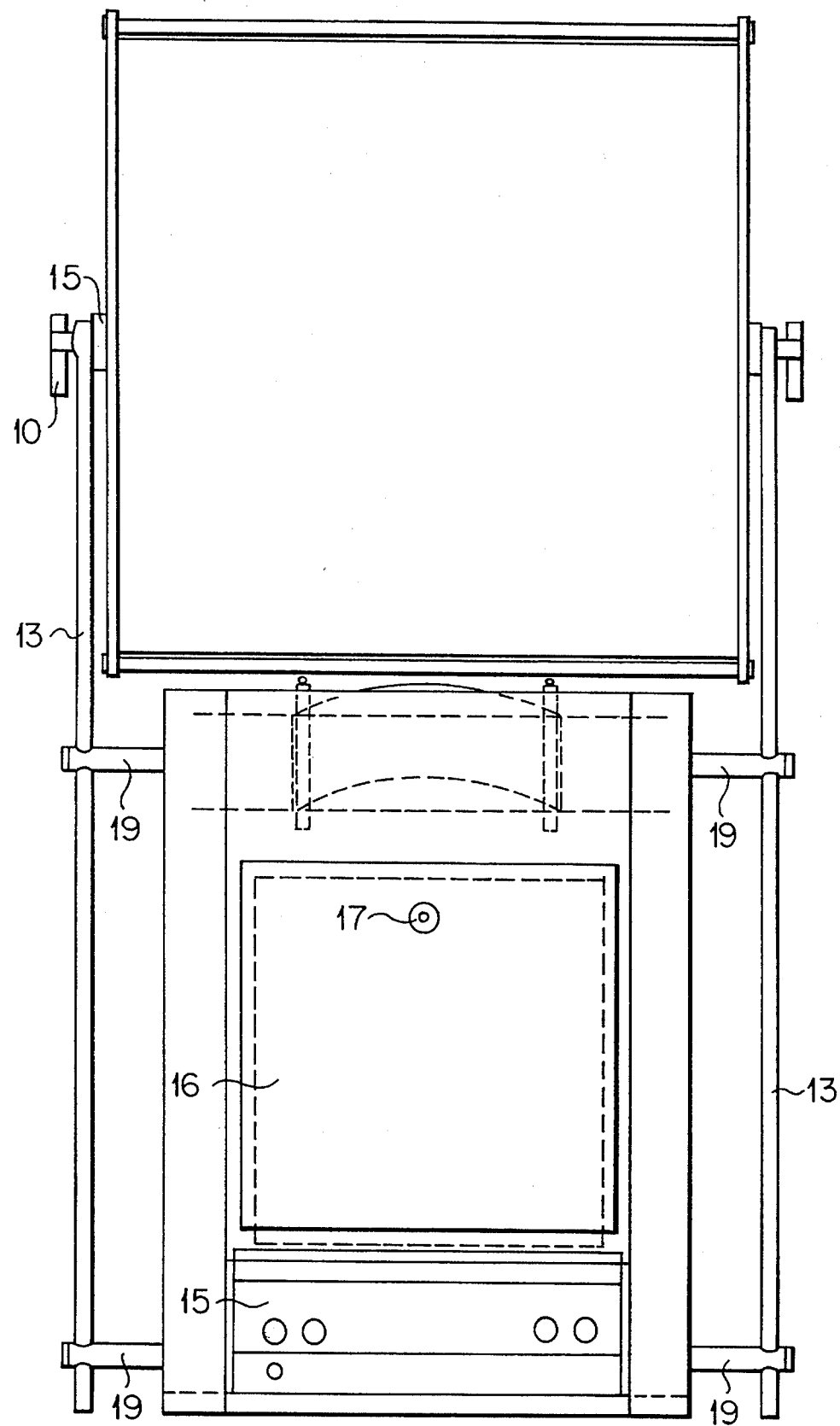
FIG. 3 is a rear view of the projector according to FIG. 2.

Housing part 8 is mounted above housing part 7 on two round rods 13, guided transversely on housing part 7, as is clearly shown in FIG. 3. Round pins 19, attached transversely on housing part 7, are perforated and through them are guided the properly fitting round rods 13 that extend upward, beyond the length of housing part 7, and that are slit at their upper ends. The interval between round rods 13 is somewhat greater than the width of the upper housing part 8. The latter has lateral thumb screws 10 in its middle section for fastening purposes, which are locknut-fixed by means of knurled nuts. Beam divider 4, in the plane shown in FIG. 2, runs diagonally through the upper housing part 8. Pin 11 of the fastening screws 10 here lies precisely in the plane of the beam splitter. The upper inside surface of housing part 8 is formed by the plane cover mirror 3. Beam splitter 4 consists of a partly permeably metal-coated glass plate. The light that falls upon beam splitter 4, focused upward from the object through the system of convex lenses 1, is partly reflected to the left by said beam splitter and is partly allowed to pass through, upward, to cover mirror 3. The rear wall of housing part 8, shown on the left in FIG. 2, can, as desired, be a bright or dark matte wall that either swallows up or diffusely reflects the light reflected upon it. The image background appears accordingly darker or brighter.

The light that is essentially completely reflected by cover mirror 3 again impacts the partly permeably metal-coated beam splitter 4, with one part of this light being passed through downward, in the direction of system of convex lenses 1; the other part of the light, which can be used for the illustration of the image, is reflected by beam splitter 4 toward the right upon the Fresnel lens 2, which is indicated merely in the form of a broken double line. A person viewing the image looks from the right, along the optical axis 6 of the Fresnel lens, seeing the image of the object located on turntable 21.

It goes without saying that, when one uses the described beam splitter 4, the role of the rear wall shown on the left in FIG. 2 and of the cover mirror 3 can also be readily switched around. Mirror 3 thus could be arranged on rear wall 9 while the cover has a dull surface. In this case, the beam path of the light used for the image would run in such a manner that the part of the light, reflected to the left against beam splitter 4, is reflected back by the mirror arranged on rear wall 9, and would again hit beam splitter 4, in which case the portion of light passing through beam splitter 4 would hit the Fresnel lens 2 and would thus generate the image of the object. The optical path of this light in the arrangement illustrated has exactly the same length in both cases so that there would be no change in the condition of afocality. The portion of light used for the image in both cases is up to 25%.

If one simultaneously uses a cover mirror 3 and, furthermore, another plane mirror, in place of rear wall 9, and if one adjusts the two mirrors and the beam splitter very carefully with respect to each other, then the two above-described beam paths will be superposed on each other and will generate a common image, which means that the portion of the light flow used for the image is doubled, in other words, it amounts to as much as 50%.

In FIG. 3, in a rear view, one also sees a flap or door 16 with a lock 17, providing access to the inside compartment of the lower housing part 7, in order to possibly exchange the object located on turntable 21.

Figure 4A:
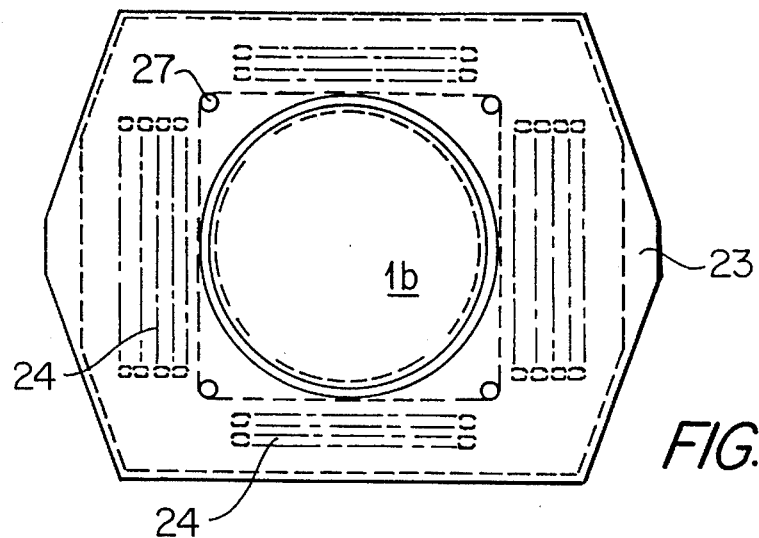
FIG. 4a is a ground plan of the lower housing part of the projector according to FIGS. 1 to 3.
Figure 4B:
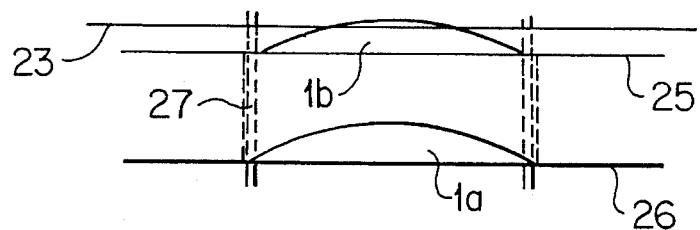
FIG. 4b shows the retaining device for the plane convex lenses in the lower housing part.

FIG. 4a is a top view of housing part 7 from above, revealing the ground plan of this housing part 7, which is essentially hexagonal. The upper part of housing part 7 is formed of an upper closing plate 23 that has a plurality of ventilation openings 24. Below the upper closing plate 23, at intervals, there are mounting plates 25 and 26, for the purpose of fixing plane convex lenses 1a and 1b. Plates 25, 26, and 23 are kept apart from each other by the desired interval by means of studs and bushings. It goes without saying that plates 23, 25, and 26 have essentially concentric focal apertures in the area of plane convex lenses 1a, 1b.

Figure 5:
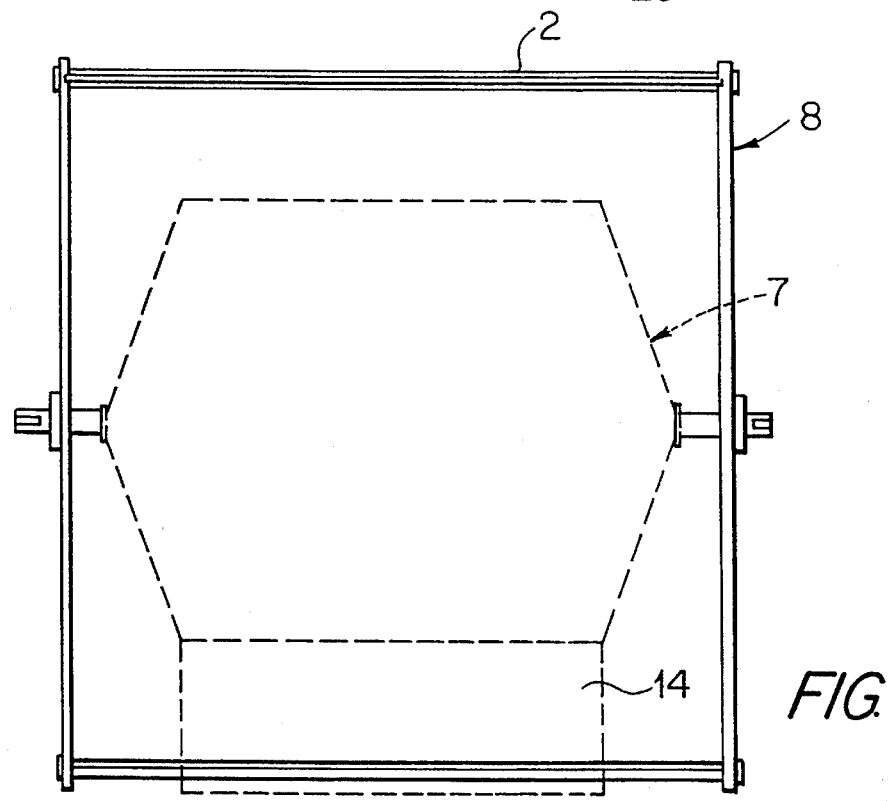
FIG. 5 is a ground plan of the upper housing part of the projector according to FIGS. 1 to 3.

FIG. 5 is a top view of the upper housing part 8, with the housing part 7 under it being shown in broken lines.

Figure 6B:
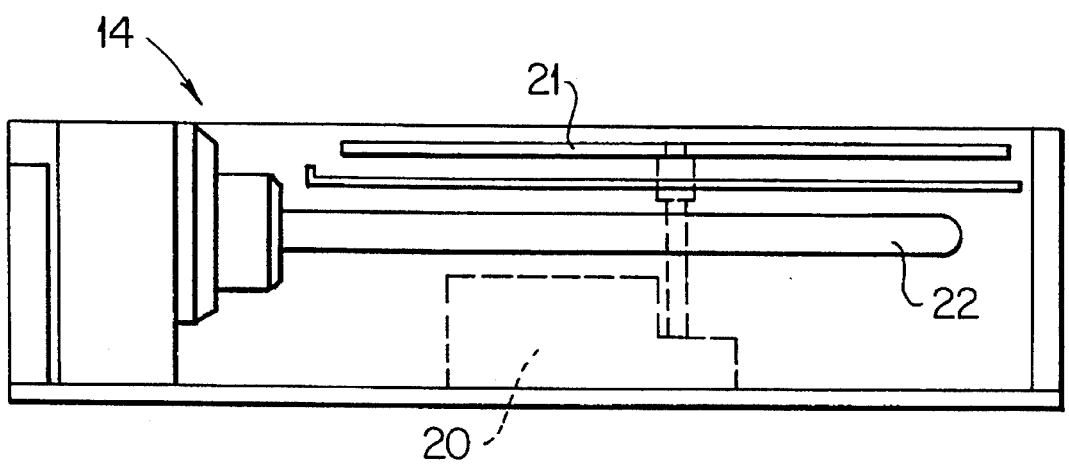

FIG. 6 illustrates the drawer part 14 that contains two fluorescent tubes 22 and a motor 20 for turntable 21. Heat generated in this housing part can be evacuated via the part of this drawer 14 that protrudes out of the lower area of housing part 7. Turntable 21 is a glass plate.

Fresnel lens 2 has a format of 400 mm×400 mm; in the process one also essentially determines the size of the second housing part 8 and the components located in it. The focal distance of the Fresnel lens is 526 mm and it is about 3.5 mm thick.

The entire projector is a two-stage, essentially afocal projection system. Minor deviations from the afocal structure do not have a disturbing effect in actual use.

In that way, one essentially gets the same reproduction scale for objects with differing object width or for all planes of a three-dimensional object spread out in depth.

The reproduction scale can basically be selected in any desired fashion and is determined during the design of the projector because it depends on the quotient of the focal distances of the two sub-systems. The reproduction scale $\beta'$ is equal to $-f'_{(2)}/f'_{(1)}$, with $f'_{(2)}$ being the focal distance of the Fresnel lens and $f'_{(1)}$ being the focal distance of system of convex lenses 1.

The depth reproduction scale $\alpha'$ is the square of the lateral reproduction scale, that is to say, $\alpha'=\beta'^2$. As a result of the afocal structure, the depth emphasis for shortening over the entire depth range is constant. In case of enlargement, the depth impression is thus reinforced.

As mentioned earlier, the three-dimensional image, generated by the projector according to FIG. 1 to FIG. 6a, b, is upright and shown with its sides in the correct position. By means of the double reflection and folding of the beam path, the projector can have a very compact structure; the dimensions of the projector essentially depend only on the size of the object, the size of the desired image segment, and the desired enlargement scale. In the specific example shown here, the magnification factor is about 2.8 so that even relatively small objects, such as watches, jewelry, and the like, will stand as comparatively large three-dimensional images in the area behind the Fresnel lens. The image brightness, with corresponding illumination, is adequate to make the image clearly visible for the observer, even with bright daylight. In the practical example, power consumption of 80 watts in the fluorescent tubes is certainly sufficient.

FIG. 7a illustrates an individual plane lens whose rear plane surface is labeled 28. In FIG. 7a, we have drawn the locations of the two main planes for the two main points Ha, Ha'. Main point H, when using the above-mentioned data for the lens, is located at an interval of 12.4 mm from plane 28. FIG. 7b shows the system of convex lenses on the side of the object which consists of two identical plane convex lenses according to FIG. 7a. The two convex lenses 1a and 1b are arranged behind each other along the same orientation and the interval of the planes of the two lenses is 51 mm. The positions of the main points of the individual lenses are drawn as are the locations of the main points H, H' of the entire lens system 1. The main point interval is labeled e.

FIG. 8 is a diagram illustrating a projector with an extended superstructure. Here, the beam splitter and the plane mirror and thus also all additional light losses are eliminated.

With respect to the orientation of the object, aerial view P is completely inverted, that is to say, the heights and sides are switched around. That is immaterial when the object is rotating. A static object must be inserted in the illumination stage "positioned on its head."

FIG. 8 furthermore illustrates the origin and development of the real-life aerial view and the depth matchup: an object point H is reproduced as beam intersection point H' in the air in front of the projector. The beams that continue to run undisturbed through H' partly get into the pupils of the eyes; the eyes see H' as a shining image dot. An object V located further forward, is reproduced according to the reproduction equations as B' also in the foreground, that is to say, the image shows the correct depth arrangement (it is orthoscopic).

The depth reproduction scale (distance H'-V' in relation to distance H-V) is tied in with the reproduction scale of the afocal system and can be varied accordingly. Here one can get a particularly plastic three-dimensional image also in case of relatively flat objects by stretching the depth distance (H'-V' greater than H-V), as shown in the drawing. Conversely, compression is also possible.

FIG. 9a, b illustrates a projector with only one plane mirror 30. Because beam splitter 4 causes the greatest light losses due to the very system involved here, that is to say, it is unavoidable, it is omitted in this type of structure. Cover mirror 3 and beam splitter 4 (two reflections) are replaced by one plane mirror 30 (only one reflection) for beam deflection. If the mirror is positioned at an angle of 45° with respect to the optical axis, then one gets a deflection of 90°.

One can get other bending angles by mirror adjustment, deviating from 45°, and adaptation of the position of the Fresnel lens. For example: if the axis of the observation beam path is to deviate from the vertical optical axis by 100°, then the mirror must be set for 50° instead of 45° and the Fresnel lens must be inclined by 10°.

Here there is none of the folding of the beam path, as a result of the back-and-forth travel between the cover mirror 3 and the beam splitter 4, as in the version according to FIGS. 1 through 6a, b: this is why the interval between the system of convex lenses 1 and the Fresnel lens 2, which is measured along the axis, must be enlarged accordingly.

One gets a "unilaterally inverted" image because only one reflection takes effect, in addition to complete image reversion due to the projection system; an orientation of the object standing on its head will not suffice to get an upright image with correct positioning of sides; instead, one needs an additional folding around an axis. In other words, objects, for example, must be written on with mirror writing; a copy with reversed sides suffices in case of level models.

FIG. 10a, b finally shows a projector with a projection head 34 that is positioned so that it is able to swing, on projector housing 33 (shown in the drawing with an intermediate interval). In this version it is possible to rotate projection head 34, consisting of a plane mirror 32 and Fresnel lens 2, with respect to the projector housing (that is arranged vertically or horizontally). A 360° rotation is possible even though this is not actually done in practical use.

In the version according to FIG. 1 to 6a, b, there is no swinging of the projection head because two coplanar reflections (that is to say, reflections agreeing in terms of the plane of incidence) (by means of cover mirror 3 and beam splitter 2) produce the property of a "corner reflector"; the beam deflection also follows a fixed direction when both mirrors are tilted together. When beam splitter 4 and cover mirror 3 are fixed with respect to each other at an angle of 45°, then the beam deflection is 90° "independent of the adjustment," in other words, it cannot be influenced by tilting the system.

When only one plane mirror is used according to FIG. 9a, b, then the deflection direction can be changed in a narrower range, as described earlier.

In the version according to FIG. 10a, b, however, one uses two non-coplanar deflection mirrors 30, 32: for example, if the projector is set up perpendicularly and if, as a result, the optical axis z determined by lens system 1, is aligned vertically, then the first 45° deflection mirror 30 causes a 90° deflection to the horizontal x direction. Another 45° deflection mirror 32 leads to another 90° beam deflection, for example, horizontally forward (y-direction).

If the projector head, consisting of mirror 32 and Fresnel lens 2, were to swing around the x-axis, then the direction of observation can be inclined in any desired fashion. For instance, in a projector head arranged above eye level, the observation direction is inclined so that the eyes of observer B would lie in the field of vision of the real-life aerial view.

With the projector lying horizontally (z, horizontal x, vertical) then one can set any desired transverse direction of viewing by swinging around the x-axis.

If, regardless of this swing, the inclination of the deflection mirror 32 and the inclination of the Fresnel lens 2 are adapted according to the version in FIG. 9a, b, then one can make a change in the direction of observation with respect to two coordinate axes (for example, horizontal rotation in a wide area by swinging the projection head around x-axis and in a narrower area, inclination upward or downward through mirror 32). Of course, this direction adaptation can be achieved by rotating the entire projector around the z-axis (in the narrow range by means of adjusting feet).

Swinging the projection head around to the x-axis will change the image orientation with respect to the object, that is to say, the image P is rotated in its plane. The drawing shows the letter L as an object (long bar v to the rear, drawn in perspective; short bar u to the right) and, in connection with this, the image u'-v', in other words, a letter L that lies flat and is rotated by 90°. The image is turned as the projection head is inclined. But there is no switching of sides ("mirror writing").

This is meaningless in the case of objects rotating around the z-axis; in static objects, the correct attachment of the object can be helped by mutually facing angle markings on the projection head adjustment and on turntable 21.

The data and calculations of the optical system of a practical example are given below:

1. SHIPPING DATA FOR INDIVIDUAL COMPONENTS TO BE ILLUSTRATED 1.1 Plane convex lenses:

Maker: Thermo-Optic Arnold GmbH & Co KG, Weilburg

Glass: B270; $n_d$=1.5231

Radius: $r_2$=−185 mm; Apex thickness: d−18.9 mm+0.3/−0.5 mm

Focal Distance: $f = -\dfrac{r_2}{n-1}$  $f = -\dfrac{-185 \text{ mm}}{0.5231} = 353.66 \text{ mm}$ $f \approx 353.7 \text{ mm}$ The lens model corresponds to data supplied by the maker.

1.2 Fresnel lens:

Maker: Tokyo Optacryl Co., Ltd., Tokyo

The data sheet shows only the condenser unit and its data:

| Format | Focal distance | Thickness | Etc. |
|---|---|---|---|
| 400 mm × 400 mm | 279 mm | 6.5 mm | |

However, only one of the Fresnel lenses, with a format of about 350 mm ×375 mm, is used here.

If the total focal distance of the lenses, arranged tightly behind each other and facing each other with their ribbing surfaces, is to be 279 mm, then the individual lens must have a focal distance of f−2·229 mm=558 mm.

A quick measurement, however, yielded an actual focal distance of:

$f$=526 mm±5 mm

This figure will be used below.

Plate thickness d≈3.5 mm.

2. CALCULATION OF MAIN POINT POSITIONS AND ADDITIONAL DATA 2.1 One plane convex lens Surface 28 is the plane surface.

Then the interval between the main point H and the first apex (= plane surface) is:

$S_1H - \dfrac{d}{n} = \dfrac{18.9 \text{ mm}}{1.5231} = 12.41 \text{ mm}.$ $\underline{S_1H \approx 12.4 \text{ mm}}$ In plane lenses, the second main point always lies in the apex of the curved surface.

In other words, we have:

$S_2H'=0$

FIG. 7 shows the main point positions.

2.2 Imaging system consisting of two identical plane lenses

This system is labeled (1) and the Fresnel lens is labeled (2). To avoid any confusion, the two individual plane lenses are labeled (a) and (b).

The interval between the plane surfaces of both lenses is 51 mm (spacer+sheet metal thickness).

Clear diameter due to diaphragm on plane surfaces≈140 mm.

Using the figures in 1.1 and 2.1, we get the following for the main point interval:

e=H'$_{(a)}$H$_{(b)}$ of the two lenses:

e=51 mm−18.9 mm+12.4 mm e=44 mm

For the system consisting of two plane lenses, one then gets the following as the focal distance:

$$f = \frac{f_{(a)} \cdot f_{(b)}}{f_{(a)} - f_{(b)}^{+e}} \quad f = \frac{353.7^2}{2 \cdot 353.7 - 44.5} = 188.72$$

$\underline{f = 188.7 \text{ mm}}$

Main points H and H' of the overall system have the following intervals from the main points of the individual lenses:

$$H_{(a)}H: e \cdot \frac{f}{f_{(b)}} \quad H_{(a)}H = 44.5 \cdot \frac{188.7}{353.7} = 23.74 \text{ mm}$$

$\underline{H_{(a)}H \approx 23.7 \text{ mm}}$ $$H'_{(b)}H' = -e \cdot \frac{f}{f_{(a)}}.$$

Because of identical focal distances of lenses (a) and (b), this follows symmetrically with respect to the first main point location:

$H'_{(b)}H' \approx -23.7$ mm.

For the sake of clarity, only the intervals $S_{1a}H$ and $S_{1a}H'$ of the two main points with respect to the plane surface of the first lens (a) are given for the following calculations:

$S_{1a}H = 1.24$ mm $+ 23.7$ mm  $S_{1a}H = 36.1$ mm $S_{1a}H' = 51$ mm $+ 18.9$ mm $- 23.7$ mm  $S_{1a}H' = 46.2$ mm

The sketch shows the essential data for system (1) consisting of two plane lenses.

2.3 Fresnel lens

Main points H and H' of the Fresnel lens coincide with adequate accuracy with the ring zone surface (ribbed surface) of the lens.

3. OPTICAL DATA OF ENTIRE SYSTEM 3.1 Focal distance and main point positions

In the following, the system consisting of two plane lenses according to 2.2 will be labeled as system (1) and the Fresnel lens will be labeled as system (2).

The main point interval of these two subsystems, $e = H'_{(1)}H_{(2)}$ results from the following calculation: According to the structural dimensions of the practical example, the interval between the plane surface of lens (b) and the Fresnel lens is $S_{1b}H_{(2)} = 208 + 172 + 172 + 176 = 728$ mm. Because H' of system 1 lies 46.2 mm behind the plane surface of lens (a), we get the following:

$e = 728 + 51 - 46.2$ mm; $e = 732.8$ mm.

In this way, one gets the following for the total focal distance of the projection system (two plane lenses+Fresnel lens):

$$f = \frac{f_{(1)} \cdot f_{(2)}}{f_{(1)} + f_{(2)}^{-e}} \quad f = \frac{188.7 \cdot 526}{188.7 + 526 - 732.8}$$

$\underline{f = -5484 \text{ mm}}$

For the main point positions of the system as a whole we get the following:

$$H_{(1)}H = e \cdot \frac{f}{f_{(2)}} \quad H_{(1)}H = 732.8 \cdot \frac{-5484}{526} \quad \underline{H_{(1)}H = 7640 \text{ mm}}$$

$$H'_{(2)}H' = -e \cdot \frac{f}{f_{(1)}} \quad H'_{(2)}H' = -732.8 \cdot \frac{-5484}{188.7}$$

$\underline{H'_{(2)}H' = 21296 \text{ mm}}$

4. AFOCAL SYSTEMS 4.1 Properties of an afocal system

An afocal ("no-focal-point") two-stage system exists when the main point interval is equal to the sum of the focal distances:

$e = f_{(1)} + f_{(2)}$

Then focal points $F'_{(1)}$ and $\overline{F}_{(2)}$ will coincide.

The following then applies to the system as a whole:

$f = \infty$, $H_{(1)}H = \infty$, $H'_{(2)}H' = \infty$.

Objects lying in infinity are again reproduced toward infinity. An example of such use is a telescope that is sharply adjusted for great distance. Afocal systems, however, have yet another very useful property: they also form objects in a finite position, specifically, with constant reproduction scale, independently of the object width (!).

We get the following for the reproduction scale:

$$\beta' = -\frac{f_{(2)}}{f_{(1)}}$$

That is the reproduction scale in the image plane x-y, perpendicular to the optical axis z.

The following depth reproduction scale, however, applies in the case of three-dimensional objects to the reproduction of the depth dimension $\Delta z$ of the object in the depth dimension $\Delta z'$ of the image:

$\alpha' = \beta'^2$

This means that the depth dimension, compared with the other dimensions, is shown enlarged by the factor $\beta'(|\beta'|>1)$ or reduced ($|\beta'|<1$). That can be helpful or disturbing, depending on the particular use.

The depth dimension is illustrated without distortions only in case of a reproduction that is not enlarged ($\beta' = \pm 1$).

By properly selecting the two focal distances $f'_{(1)}$ and $f'_{(2)}$ and properly coordinated interval e, one can thus have a wide range of reproduction scale available; three-dimensional objects are illustrated along their depth dimension with a constant reproduction scale of $\beta'$ but they are emphasized or shortened in terms of their depth impression (as much as $\beta' = \pm 1$).

4.2 Real-life system according to Section 3

The large figures for $f (\approx -5.5 \text{ m})$, $H_{(1)}H (\approx 7.6 \text{ m})$ and $H'_{(2)}H' (\approx 21.3 \text{ m})$ and the closely adjacent focal points $F'_{(1)}$ and $\overline{F}_{(2)}$, show that the built-up system represents an approximation to an afocal system.

In our case, we got a main point interval $e = 732.8$ mm; for an afocal system we would have to have:

$e = 526 \text{ mm} + 188.7 \text{ mm}, \quad \underline{e = 714.7 \text{ mm}}$

Difference: 18.1 mm

This difference, first of all, has no great effect on the use of the projector; second, the difference is within the tolerance spread, because of the tolerances of various dimensions (among other things, focal distance of the Fresnel lens, data, and drawings).

This means that (at least for a certain wavelength) for the built-up projector one can also get a strictly afocal arrangement.

If we assume a strictly afocal arrangement, that is to say, if we have:

$f_{(1)} = 188.7$ mm; $f_{(2)} = 526$ mm; $e = 714.7$ mm, then the reproduction scale turns out to be:

$\beta' = -\frac{526}{188.7}$ ; $\underline{\beta' = -2.79}$

-continued more specifically: −2.7875)

and the depth reproduction scale turns out to be:

$$\alpha'=(-2.79)^2; \alpha'=7.78$$

A three-dimensional object is thus reproduced in all three dimensions with an enlargement of 2.79; but in the depth direction, it is stretched out additionally by a factor of 2.79 (increased emphasis of depth).

In the following, we will compare these data for the afocal arrangement with real-life data.

5. REPRODUCTION OF THREE-DIMENSIONAL OBJECTS BY PROJECTOR

5.1 Reproduction of a plane

As an example, the reproduction of the plane of "maximum sharpness" is calculated in detail according to the above data.

In the drawing, the interval between this plane and the plane surface of lens (a) is given as follows: $s_{1a}=-150$ mm.

For system (1), that results in a object width of $a_{(1)}=s_{1a}-S_{1a}H$; $a_{(1)}=-150$ mm$-36.1$ mm; $a_{(1)}=-1.86.1$ mm.

Using the reproduction equation, one gets the image width:

$$a'_{(1)} = \frac{a_{(1)} \cdot f_{(1)}}{a_{(1)} + f_{(1)}} \quad ; \quad a'_{(1)} = \frac{(-186.1) \cdot 188.7}{-186.1 + 188.7}$$

$$a'_{(1)} = -13507 \text{ mm.}$$

For system (1), the reproduction scale turns out to be as follows:

$$\beta'_{(1)} = a'_{(1)}/a_{(1)}; \quad \beta'_{(1)} = +72.58.$$

The reproduction by means of the plane lens system is greatly enlarged and virtual.

The virtual image of (1) is now reproduced by the Fresnel lens (2). We have the following:

$$a_{(2)}=a'_{(1)}-e; \quad a_{(2)}=-13507 \text{ mm}-732.8 \text{ mm}; \quad a_{(2)}=-14240 \text{ mm}.$$

With the help of the reproduction equation, one gets the image width:

$$a'_{(2)} = \frac{a_{(2)} \cdot f_{(2)}}{a_{(2)} + f_{(2)}} \quad ; \quad a'_{(2)} = \frac{(-14240) \cdot 526}{-14240 + 526} \quad ;$$

$$a'_{(2)} = 546 \text{ mm.}$$

For Fresnel lens (2) one gets the reproduction scale:

$$\beta'_{(2)} = a'_{(2)}/a_{(2)}; \quad \beta'_{(2)} = -0.03834.$$

One thus gets the overall reproduction scale:

$$\beta' = \beta'_{(1)} \cdot \beta'_{(2)}; \quad \beta' = -2.783.$$

The reproduction scale thus deviates only very little from the figure calculated in 4.2 (afocal case).

The image of the object plane that is 150 mm in from of the plane surface of the first lens thus lies as a real-life aerial view at an interval of 546 mm in front of the Fresnel lens, in other words, in the area between the projector and the observer.

The figures in the following table were calculated according to this example.

In column 1, the table shows the location of the object plane, that is to say, the interval $s_{1a}$ from the plane surface of the first lens.

Column 6 shows the image width $a'_{(2)}$ that is to say, the interval between the image and the Fresnel lens.

Positive values signify a position of the image in front of the Fresnel lens, that is to say, in the area between the Fresnel lens and the observer. The image is real.

In case of negative values, the image lies behind the Fresnel lens, that is to say, "in the projector." The image is then virtual.

When $s_{1a} \approx -218$ mm, the image coincides with the Fresnel lens.

In all of these data one must keep in mind that somewhat different values can be obtained during practical measurement on the projector due to the structural component and dimension tolerances in the structure.

The depth reproduction scale (column 9) was not calculated as $\beta'_2$, but rather from the actual differences in the image locations and object locations.

The image location $a'_{(2)}$ as a function of the object location $s_{1a}$ has an almost linear connection; in case of the afocal structure, it would be strictly linear. In this case (only for this projector!), the image position could also be calculated from the following equation:

$$a'_{(2)}=1992 \text{ mm}+7.769 \cdot a_{(1)}.$$

In columns 8 and 9, the table shows that $\beta'$ and $\alpha'$ are not completely constant. That is a consequence of the not strictly afocal structure.

| | 5.2 Table with object locations, image locations, reproduction scales, graphic illustration of connection between object locations and image locations | | | | | | | |
|---|---|---|---|---|---|---|---|---|
| 1 Interval between plane surface and lens (a) | 2 $a_{(1)}$ | 3 $a'_{(1)}$ | 4 $\beta'_{(1)}$ | 5 $a_{(2)}$ | 6 $a'_{(2)}$ | 7 $\beta'_{(2)}$ | 8 $\beta'$ | 9 $\alpha'$ |
| −90 | −126.1 | −380.11 | 3.0144 | −1112.91 | 997.41 | −0.89662 | −2.702 | 7.37 |
| −110 | −146.1 | −647.16 | 4.4296 | −1379.96 | 849.99 | −0.61595 | −2.728 | 7.52 |
| −130 | −166.1 | −1386.86 | 8.3495 | −2119.60 | 699.61 | −0.33006 | −2.756 | 7.67 |
| −150 "maximum sharpness" | −186.1 | −13506.6 | 72.577 | −14239.4 | 546.18 | −0.038357 | −2.784 | 7.83 |
| −170 | −206.1 | 2235.12 | −10.845 | 1502.32 | 389.59 | 0.25933 | −2.812 | 7.99 |

5.2 Table with object locations, image locations, reproduction scales, graphic illustration of connection between object locations and image locations

| 1 Interval between plane surface and lens (a) | 2 $a_{(1)}$ | 3 $a'_{(1)}$ | 4 $\beta'_{(1)}$ | 5 $a_{(2)}$ | 6 $a'_{(2)}$ | 7 $\beta'_{(2)}$ | 8 $\beta'$ | 9 $\alpha'$ |
|---|---|---|---|---|---|---|---|---|
| −190 | −226.1 | 1140.78 | −5.0455 | 407.98 | 229.77 | 0.56319 | −2.842 | 8.16 |
| −210 | −246.1 | 809.04 | −3.2874 | 76.24 | 66.59 | 0.87343 | −2.871 | 8.33 |
| −230 | −266.1 | 648.75 | −2.4380 | −84.05 | −100.03 | 1.1901 | −2.901 | 8.51 |
| −250 turntable stage | −286.1 | 554.28 | −1.9374 | −178.52 | −270.24 | 1.5138 | −2.933 | |

DIMENSION OF IMAGE ERECTION IN THE VERSION ACCORDING TO FIGS. 1 TO 6a,b

The projector generates an upright image of an image, that is to say, the image shows the same orientation as the object in the X-Y plane perpendicular to the direction of propagation.

The letter "L" is used as orientation symbol in FIG. 1; one can see it in the same position in object O and image P.

The determination of the direction of observations also exerts essential influence here: object O is viewed from above when the turntable 21 is loaded (obliquely), with observer A standing behind the projector. Image P is observed from the front of the projector (looking at the Fresnel lens).

By means of two coplanar reflections (cover mirror 3 and beam splitter 4), together with a change in the direction of observation, one gets a completely inverted image (symbol to the left of the Fresnel lens).

The imaging system once again causes a complete inversion and thus, on the whole, an upright erection (symbol to the right of the Fresnel lens).

The inversion due to the reproduction system always takes place with the real reproduction: in the observed range of −90 mm to −150 mm (column 1 in table 5.2); the intermediate image, produced by plane lens system 1, is virtual; it is reproduced in real terms by Fresnel lens 2.

In the range from −170 mm to −250 mm, the intermediate image is real and thus inverted; the Fresnel lens no longer influences the image position because it generates either a real image of a virtual object (−170 mm to −210 mm) or a virtual image of a real object (−230 mm; −250 mm).

Overall, in other words, it turns out that, considering the direction of observation, the combination of two coplanar reflections and a one-time inversion by the two-stage projection system yields an upright image.

The coplanar reflections are of course missing in the up-folded beam path (see FIG. 8); the image is completely inverted when observing the object and the image from the same direction. This is why column 8 in table 5.2 always shows a negative overall reproduction scale $\beta'$, that is to say, image inversion!

What is claimed is:

1. An optical projector comprising means for supporting an object to be viewed; a first convex lens system positioned on the optical axis of the projector and adjacent to said object supporting means; a second convex lens system positioned on said optical axis remote from said object supporting means including a Fresnel lens, the length of an optical beam path, measured along the optical axis between said first convex lens system and said second convex lens system being essentially equal to the sum of the focal distances of said first and second convex lens systems, the diameter of the lenses of said first and second convex lens systems being greater than the extent of the object to be reproduced as measured transversely with respect to said optical axis, and the distance, along said optical axis between said supporting means and said first convex lens system being sufficiently small that a three dimensional object, supported on said supporting means will be reproduced at least partly in the beam path behind said Fresnel lens as a three-dimensional aerial image.

2. Projector according to claim 1, wherein the focal distance of the Fresnel lens is greater than the focal distance of said first convex lens system.

3. Projector according to claim 1 wherein said object supporting means is positioned, in use, beneath said first convex lens system, wherein a reflector device is positioned above said first convex lens system, and wherein said Fresnel lens is positioned adjacent said reflector.

4. Projector according to claim 3, wherein the reflector device comprises a beam splitter that is inclined toward the main optical axis of the first convex lens system and that is partly permeably metal-coated, and at least one plane mirror arranged essentially transversely or parallel with respect to the main optical axis of the first convex lens system.

5. Projector according to claim 4, wherein the beam splitter is inclined toward the main optical axis of the first convex lens system at an angle of about 35° to 55°.

6. Projector according to claim 3, wherein the reflector device includes a first plane mirror that is inclined toward the main optical axis of the first convex lens system at an angle of about 35° to 55°.

7. Projector according to claim 6, wherein the reflector device includes a second plane mirror that is arranged in the beam path between the first plane mirror and the Fresnel lens and that is inclined toward the main axis of the Fresnel lens at an angle of about 35° to 55°.

8. Projector according to claim 7, further comprising means for permitting the second plane mirror and the Fresnel lens to be rotated as a unit with respect to the first convex lens system and the first plane mirror around an axis located transversely with respect to the main optical axes of the first convex lens system and of the Fresnel lens.

9. Projector according to claim 3, wherein the reflector device and the Fresnel lens are swivelable as a unit with respect to the first convex lens system around an axis located transversely with respect to the main optical axis of said first convex lens system.

10. Projector according to claim 1, wherein said object support means comprises a rotatable turntable.

* * * * *